(12) United States Patent
Leung et al.

(10) Patent No.: US 6,795,857 B1
(45) Date of Patent: Sep. 21, 2004

(54) METHODS AND APPARATUS FOR PROVIDING MOBILITY OF A NODE THAT DOES NOT SUPPORT MOBILITY

(75) Inventors: Kent K. Leung, Mountain View, CA (US); Gopal K. Dommety, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 69 days.

(21) Appl. No.: 10/241,286

(22) Filed: Sep. 9, 2002

Related U.S. Application Data

(63) Continuation of application No. 09/333,831, filed on Jun. 15, 1999.

(51) Int. Cl.[7] ........................ G06F 15/173; H04L 12/28
(52) U.S. Cl. ...................................... 709/224; 370/401
(58) Field of Search ................................ 709/224, 229, 709/250, 242, 223; 711/117; 370/401, 432, 389

(56) References Cited

U.S. PATENT DOCUMENTS

| | | | |
|---|---|---|---|
| 4,692,918 A | 9/1987 | Elliott et al. | 370/85 |
| 5,016,244 A | 5/1991 | Massey et al. | 370/16 |
| 5,018,133 A | 5/1991 | Tsukakoshi et al. | 340/825.05 |
| 5,218,600 A | 6/1993 | Schenkyr et al. | 370/16 |
| 5,371,852 A | 12/1994 | Attanasio et al. | 395/200 |
| 5,473,599 A | 12/1995 | Li et al. | 370/16 |
| 5,572,528 A | 11/1996 | Shuen | 370/338 |
| 5,825,759 A | 10/1998 | Liu | 370/331 |
| 6,163,843 A | 12/2000 | Inoue et al. | 709/225 |
| 6,167,513 A | 12/2000 | Inoue et al. | 380/255 |
| 6,172,986 B1 | 1/2001 | Watanuki et al. | 370/401 |
| 6,256,300 B1 | 7/2001 | Ahmed et al. | 370/331 |
| 6,272,129 B1 | 8/2001 | Dynarski et al. | 370/352 |
| 6,339,830 B1 | 1/2002 | See et al. | 713/202 |
| 6,393,482 B1 | 5/2002 | Rai et al. | 709/217 |

OTHER PUBLICATIONS

Release notes for 3Com Corporation, "Conducting a Redundant Route for Network Resiliency," Mar. 1994, *NET Builder Family Bridge/Router* pp. 26–29.

Uyless Black, "TCP/IP and Related Protocols," 1992, *McGraw–Hill, Inc.,* pp. 226–249.

T. Li et al., RFC 2281 "Cisco Hot Standby Router Protocol (HSRP)," Mar. 1998.

(List continued on next page.)

*Primary Examiner*—Krisna Lim
(74) *Attorney, Agent, or Firm*—Beyer Weaver & Thomas LLP

(57) ABSTRACT

Methods and apparatus for enabling a node that does not support Mobile IP to roam from a first Foreign Agent to a second Foreign Agent are disclosed. In a Foreign Agent that supports Mobile IP, a method of registering a node that does not support Mobile IP with a Home Agent that supports Mobile IP includes detecting a node in a vicinity of the Foreign Agent, composing a registration request specifying a node ID associated with the node, and sending the registration request to the Home Agent. When the Home Agent receives the registration request from a first Foreign Agent, the Home Agent updates a mobility binding table to associate the first Foreign Agent with the node. In addition, the Home Agent notifies a second Foreign Agent to update its visitor table to reflect roaming of the node from the second Foreign Agent to the first Foreign Agent.

42 Claims, 14 Drawing Sheets

OTHER PUBLICATIONS

Chambless, et al., "Home Agent Redundancy Protocol (HARP)," Oct. 27, 1997.

Network Working Group, RFC 2002 "IP Mobility Support," Oct. 1996.

C. Perkins, "Mobility Support," RFC2002, IBM Corporation, Oct. 1996.

"Mobile IP," Release 12.0(1)T, pp. 1–55.

Montenegro, G., "Reverse Tunneling for Mobile IP," RFC 2344, Sun Microsystems, Inc., pp. 1–19, May 1998.

D. Harkins and D. Carrel, "The Internet Key Exchange (IKE)," Cisco Systems, pp. 1–33, Jun. 1998.

D. Cong and M. Hamlen, and C. Perkins, "The Definitions of Managed Objects for IP Mobility Support using SMIv2," RFC2006, Motorola and IBM, pp. 1–52, Oct. 1996.

| Mobile Node | SPI | Key | Algorithm | Mode | Replay Timer |
|---|---|---|---|---|---|
| IPaddr 1 | SPI 1 | Key 1 | e.g., RSA | e.g., prefix-suffix | Timestamp 1 |
| IPaddr 2 | SPI 2 | Key 2 | e.g., RSA | e.g., prefix-suffix | Timestamp 2 |
| IPaddr 3 | SPI 3 | Key 3 | e.g., RSA | e.g., prefix-suffix | Timestamp 3 |
| ⋮ | ⋮ | ⋮ | ⋮ | ⋮ | ⋮ |
| ⋮ | ⋮ | ⋮ | ⋮ | ⋮ | ⋮ |
| ⋮ | ⋮ | ⋮ | ⋮ | ⋮ | ⋮ |
| IPaddr N | SPI N | Key N | - | - | Timestamp N |

Figure 3E

METHODS AND APPARATUS FOR PROVIDING MOBILITY OF A NODE THAT DOES NOT SUPPORT MOBILITY

CROSS REFERENCE TO RELATED APPLICATIONS

This application is a continuation application and claims priority of U.S. patent application Ser. No. 09/333,831, filed Jun. 15, 1999, entitled "Methods and Apparatus for Providing Mobility of a Node that Does Not Support Mobility" which is incorporated by reference.

BACKGROUND OF THE INVENTION

1. Field of the Invention

The present invention relates to network technology. More particularly, the present invention relates to providing mobility of a node that does not support mobility.

2. Description of the Related Art

Mobile IP is a protocol which allows laptop computers or other mobile computer units (referred to herein as "Mobile Nodes") to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts (Mobile IP) Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) connected to its home network segment (in a wired or wireless network) connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request from the Mobile Node 6 to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the to IP address of Mobile Node 6 on sub-network 12. The packets of that message are then forwarded over the internet 4 and to router RI and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on network segment 14. The packet forwarding mechanism implemented by the Home and Foreign Agents is often referred to as "tunneling."

As described above, a Mobile Node may register with its Home Agent after roaming to a Foreign Agent. The Mobile Node may then further roam to a second Foreign Agent. Upon de-registering, the Mobile Node then may again register with its Home Agent so that it may receive packets via the second Foreign Agent. Thus, through the registration process, a Mobile Node may receive packets sent to it by a Corresponding Node via the Foreign Agent that the Mobile Node is visiting.

Currently, Mobile IP as described in RFC 2002 requires that Mobile Nodes (e.g., laptops, cell phones) implement the Mobile IP protocol. However, major operating system vendors are not currently implementing the Mobile IP protocol in their operating system software. Similarly, proprietary operating systems typically do not implement the Mobile IP protocol. Thus, although a node may theoretically achieve mobility through the Mobile IP protocol, this feature is not commonly available to today's consumers.

In view of the above, it would be desirable to have techniques for implementing mobility in nodes without implementing mobility support (e.g., Mobile IP software) in the nodes themselves.

SUMMARY OF THE INVENTION

The present invention provides methods and apparatus for enabling a node that does not support Mobile IP to roam to various Foreign Agents so that it may receive packets sent to it by a corresponding node. This is accomplished, in part, through enabling a Foreign Agent to independently perform registration on behalf of the node. In addition, a Home Agent associated with the node independently performs de-registration on behalf of the node when the node roams to a Foreign Agent from the Home Agent or another Foreign Agent. It is important to note that this is achieved without any communication from the node indicating its desire to register or de-register. Moreover, because the node does not implement the Mobile IP protocol, it is desirable to implement a virtual Foreign Agent such that the node appears to send a packet to only one Foreign Agent rather than to different Foreign Agents each time the node roams to a new Foreign Agent.

Since the node does not support Mobile IP, it is preferable that it appears to the node that the node is sending and receiving packets through only one router (e.g., Foreign Agent) that is the default gateway. According to one aspect of the invention, this is accomplished through the implementation of a virtual Foreign Agent. Thus, in a Foreign Agent supporting Mobile IP, a method of implementing a virtual Foreign Agent in a network having a plurality of Foreign Agents includes associating a single dummy interface IP address with an interface of each one of the plurality of Foreign Agents. In this manner, a dummy interface IP address is associated with each Foreign Agent, thereby facilitating communication between the node and one of the Foreign Agents via the dummy interface IP address. According to one embodiment, an interface of each of the Foreign Agents is associated with the same MAC address. According to another embodiment, an interface of each of the Foreign Agents is associated with a different MAC address. Upon completion of the proxy registration, the Foreign agent may update the node with the MAC address of the default gateway through a gratuitous ARP where the Foreign Agents are associated with different MAC addresses. The dummy interface IP address (i.e., virtual agent IP address) is then mapped (e.g., in the node's Address Resolution Protocol (ARP) table) to the MAC address of the appropriate foreign agent (i.e., virtual agent MAC address). Accordingly, the present invention enables a node that does not implement the Mobile IP protocol to roam to Foreign Agents and therefore send packets to the default gateway (e.g., Foreign Agent). Once the Foreign Agent receives a packet (e.g., data packet), it will send a registration request to the node's Home Agent on behalf of the node. Upon completion of the node's registration with the node's Home Agent, the Foreign Agent may then forward packets received from the Home Agent to the node. Accordingly, through the use of the present invention, a node that does not support mobility can receive packets addressed to it through the virtual Foreign Agent.

Alternatively, according to another aspect of the invention, rather than maintaining a different MAC address for each Foreign Agent, a single MAC address is associated with multiple Foreign Agents. In addition, a node will include a mapping between the MAC address and the default gateway's IP address. In a network such as a wireless network, only one Foreign Agent will be connected at any point in time. Accordingly, a node may successfully send packets to the single MAC address so that they are received by the appropriate Foreign Agent.

According to another aspect of the invention, a Foreign Agent initiates registration on behalf of the node. First, the Foreign Agent detects a node in a vicinity of the Foreign Agent. For instance, the node may be detected when an ARP request is received, or when a data or access point control packet is received. Upon detection of the node, a registration request specifying a node ID associated with the node (e.g., Home Address) is composed. The registration request is then sent to the Home Agent. Once registered, the Foreign Agent may receive a registration reply from a Home Agent associated with the node. Upon receipt of the registration reply, the Foreign Agent may determine from the registration reply the success or failure of the registration.

According to yet another aspect of the invention, the Home Agent performs de-registration on behalf of the node. Upon receiving the registration request from a first Foreign Agent, the Home Agent updates a mobility binding table to associate the first Foreign Agent with the node. In addition, the Home Agent notifies a second Foreign Agent to update its visitor table to reflect roaming of the node from the second Foreign Agent to the first Foreign Agent. Moreover, when a node returns to its Home Agent, the Home Agent updates its mobility binding table and notifies the previous Foreign Agent to update its visitor table accordingly. In this manner, registration and de-registration on behalf of a node that does not support Mobile IP may be implemented. Accordingly, the node may effectively roam to various Foreign Agents within a network even though it does not implement the Mobile IP protocol.

BRIEF DESCRIPTION OF THE DRAWINGS

FIG. 3E is a block diagram illustrating an exemplary security association table that may be accessed by the Home Agent and the Foreign Agent according to an embodiment of the invention.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

An invention is described herein that enables a node that does not implement the Mobile IP protocol to roam to various Foreign Agents within a network. This is accomplished, in part, through the use of a dummy interface IP address assigned to multiple Foreign Agents. For purposes of the following discussion, the term "mobile node" will be used to refer to a mobile node implementing the Mobile IP protocol while the term "node" will be used to refer to a node that does not implement the Mobile IP protocol.

Figure 1:
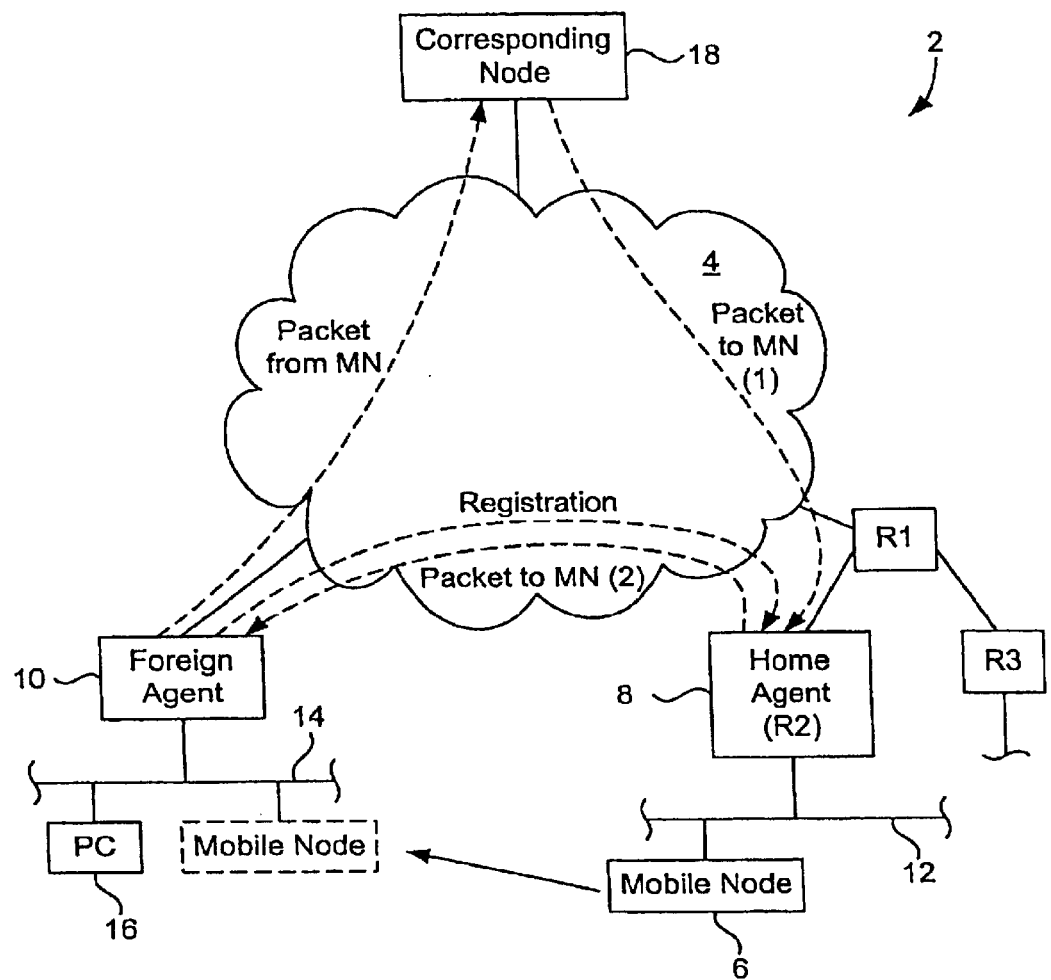
FIG. 1 is a diagram of a Mobile IP network segment and associated environment.
Figure 2:
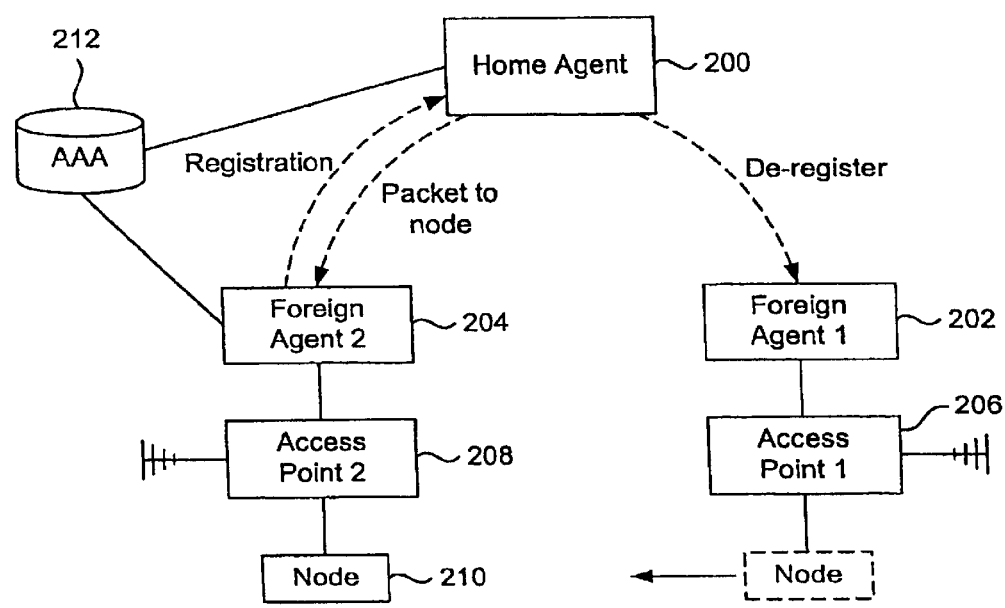
FIG. 2 is a block diagram illustrating a system in which the present invention may be implemented.

FIG. 2 is a block diagram illustrating a system in which the present invention may be implemented. In the following description, the present invention is implemented in a wireless network. However, although the present invention is described as being implemented in a wireless network, the present invention may be implemented in a non-wireless network. As shown, a node may roam from its Home Agent 200 to a first Foreign Agent 202 as well as a second Foreign Agent 204. In a wireless network, Access Points 206 and 208 are coupled to the Foreign Agents 202 and 204. By way of example, in a wireless network, the Access Points 206 and 208 may have an antenna and receiver for receiving packets. As yet another example, the Access Points 206 and 208 may designate connection points in a non-wireless network.

Typically, a mobile node implementing Mobile IP registers and de-registers with its Home Agent through the registration process. However, according to the present invention, registration is performed by the Foreign Agent on behalf of the visiting node. Similarly, de-registration is performed by the node's Home Agent on behalf of the roaming node. For instance, node 210 that has roamed to the first Foreign Agent 202 is registered with the node's Home Agent 200 when the first Foreign Agent 202 composes and sends a registration request packet. Thus, the first Foreign Agent's visitor table and the Home Agent's mobility binding table are updated to indicate that the node has roamed to the first Foreign Agent 202. When the node 210 roams to the second Foreign Agent 204, the Home Agent 200 de-registers the node 210. In other words, the Home Agent notifies the first Foreign Agent 202 to update its visitor table to reflect the movement of the node 210. Similarly, the Home Agent's mobility binding table is updated to reflect the movement of the node 210 to the second Foreign Agent 204. Thus, the appropriate entry in the first Foreign Agent's visitor table and the Home Agent's mobility binding table may be deleted. A new entry is then entered in the Home Agent's mobility binding table and the second Foreign Agent's visitor table upon completion of registration of the mobile node with the Home Agent.

Figure 5:
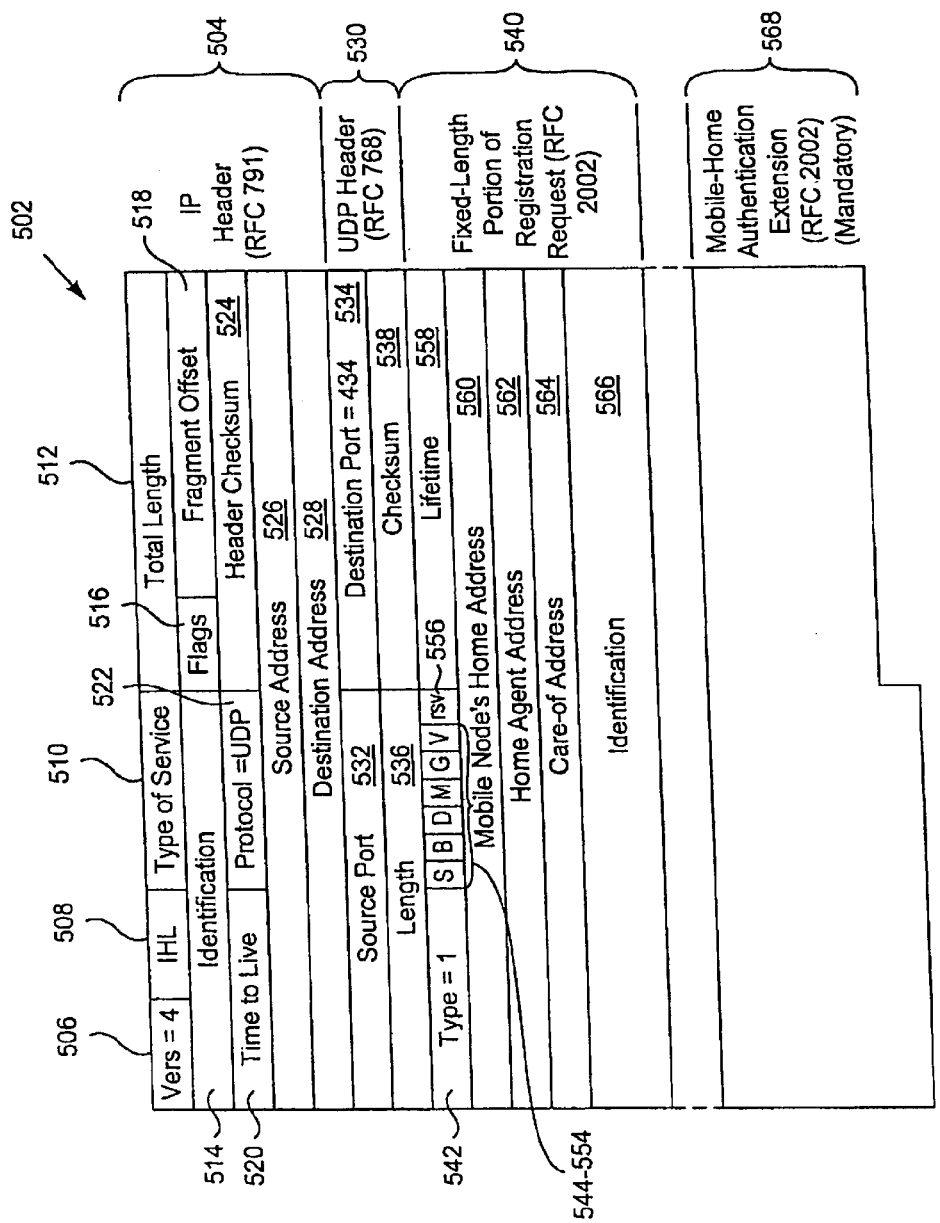
FIG. 5 is a diagram illustrating a registration request having an extension that may be sent by a Foreign Agent in accordance with an embodiment of the invention.

As will be shown and described below with reference to FIG. 5, a Mobile-Home Authentication Extension is required in the registration request packet as specified by RFC 2002. In order to create and append this Mobile-Home Authentication Extension or another authentication extension (e.g., Foreign-Home Agent authentication extension), an authentication key that is to be shared between the node and the Home Agent is provided. In this manner, the node may be authenticated during registration. However, it is important to note that the node does not implement the Mobile IP protocol, and therefore the node cannot send registration request packets or receive registration reply packets. Thus, the registration of the node is actually performed by the Foreign Agent on behalf of the node. Thus, the key is actually shared by the Foreign Agent and the Home Agent. According to the present invention, there two ways in which a Foreign Agent may obtain an authentication key for a node for which the Foreign Agent is performing a proxy registration. First, the Foreign Agent may be configured manually with an authentication key for one or more nodes. Second, a server may be configured to receive a request for an authentication key from a Foreign Agent that supports Mobile IP, where the request identifies a node visiting the Foreign Agent. The server may then provide the authentication key associated with the node to the Foreign Agent. Moreover, the server may store keys for nodes supported by multiple Home Agents.

A class of servers known as "AAA" or triple-A servers may be employed to store the shared authentication key for one or more nodes. The AAA represents authentication, authorization, and accounting. Various protocols such as the Remote Authentication Dial In User Service (RADIUS) and TACACS+ may be implemented to provide such a server. Note that the Home Agent or Foreign Agent providing accounting information to the server must provide communications in formats required by the AAA server protocol. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes.

Since the node does not implement the Mobile IP protocol, it cannot send registration packets. Similarly, the node is not capable of receiving registration reply packets. The Foreign Agent therefore registers the node with the Home Agent on behalf of the node. More particularly, the Foreign Agent performs this registration when the node is "detected" by the Foreign Agent. In other words, the Foreign Agent may detect that the node wishes to send and receive packets via the Foreign Agent (i.e., visit the Foreign Agent).

Typically, when a mobile node implementing the Mobile IP protocol roams to a Foreign Agent, it composes and sends a registration request packet to the Foreign Agent. However, since the node of the present invention does not implement the Mobile IP protocol, it cannot itself send a registration request packet via the Foreign Agent. As a result, the Foreign Agent must detect the node in another manner. Three exemplary methods of detecting a node are listed here. First, a node may be detected upon receipt of an Address Resolution Protocol (ARP) request. More particularly, in order to send a packet to a destination IP address, a node must obtain the MAC address or "link-layer address" associated with the destination IP address. A node typically obtains a MAC address associated with an intended destination IP address by sending an ARP request to the Foreign Agent.

Second, a node may attempt to send an actual data packet via the Foreign Agent. Thus, in this instance, the receipt of the data packet triggers the sending of a control packet (i.e., registration request packet) by the Foreign Agent. Third, an access point control packet may be received. For instance, when a device communicates with an access point, the access point sends a control packet to the Foreign Agent. Thus, once the node is detected, the Foreign Agent generates and sends a registration request to the node's Home Agent.

Figure 3A:
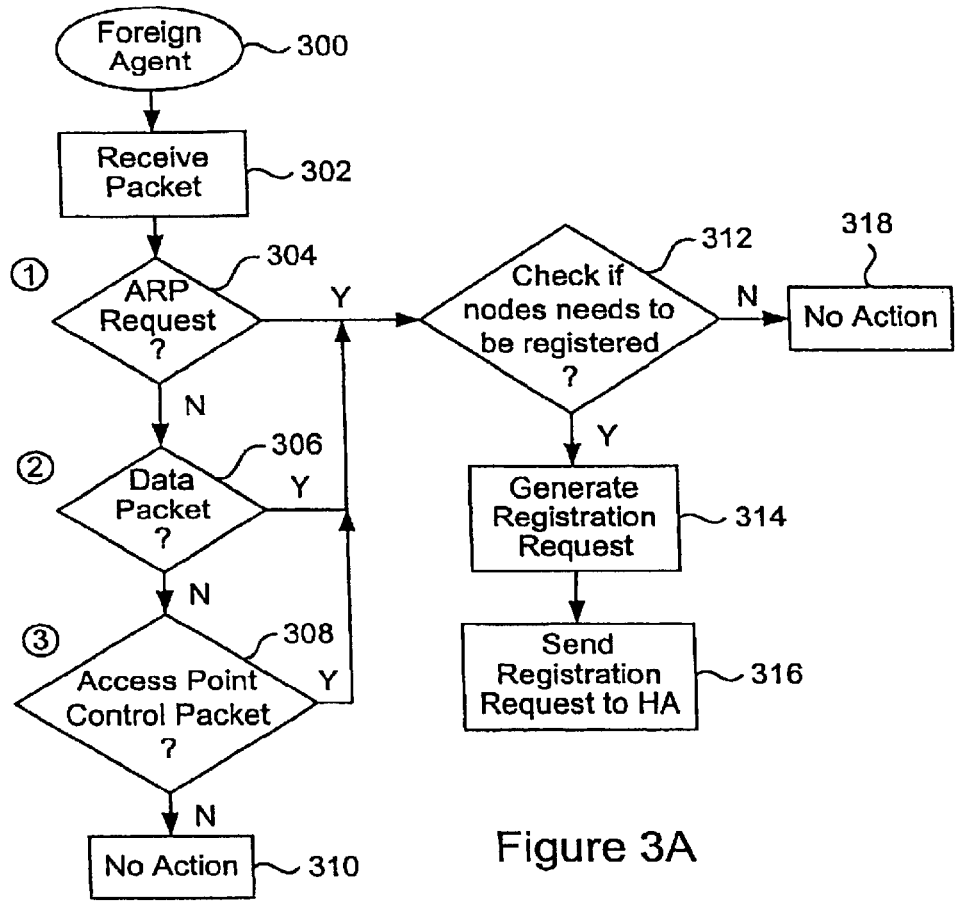
FIG. 3A is a flow diagram illustrating one method of sending a registration request packet via a Foreign Agent according to an embodiment of the invention.

As described above, the Foreign Agent detects the node that has roamed to it and sends a registration request to the Home Agent. One method of sending a registration request packet via a Foreign Agent according to an embodiment of the invention is illustrated in FIG. 3A. The Foreign Agent 300 first receives a packet at block 302. From this packet, the Foreign Agent may determine whether a node has been detected. By way of example, the Foreign Agent may conclude that a node has been detected if the packet is determined to be an ARP request, a data packet from an unregistered node, or an access point control packet. The Foreign Agent may determine that the node has not registered with its Home Agent via the Foreign Agent by comparing a node ED such as the Home Address (i.e., IP address) of the node with the node ID of one or more nodes identified in the Foreign Agent's visitor table. Thus, it is next determined whether the packet is an ARP request at block 304. If the packet is not an ARP request, it is determined at block 306 whether the packet is a data packet. If the packet is not a data packet, it is determined whether the packet is an access point control packet at block 308. If the packet does not fall into any of these categories, a node has not been detected, and no action need be taken as indicated at block 310. However, if the packet has been determined to be an ARP request, a data packet, or access control packet at one of blocks 304 through 308, the Foreign Agent then checks if the node needs to be registered at block 312. For instance, the node may not be permitted to roam in the network associated with the destination address as specified in the data packet. Such access rules may be provided in an access list of the Foreign Agent. Thus, the Foreign Agent checks if the IP address of the node (i.e., source address) is in the access list of the Foreign Agent. If it is determined that the node has access privileges, a registration request is generated at block 314 and the registration request is sent to the Home Agent at block 316. However, if it is determined at block 312 that the node does not have access to the network specified by the destination address, no action is taken as indicated at block 318.

Figure 3B:
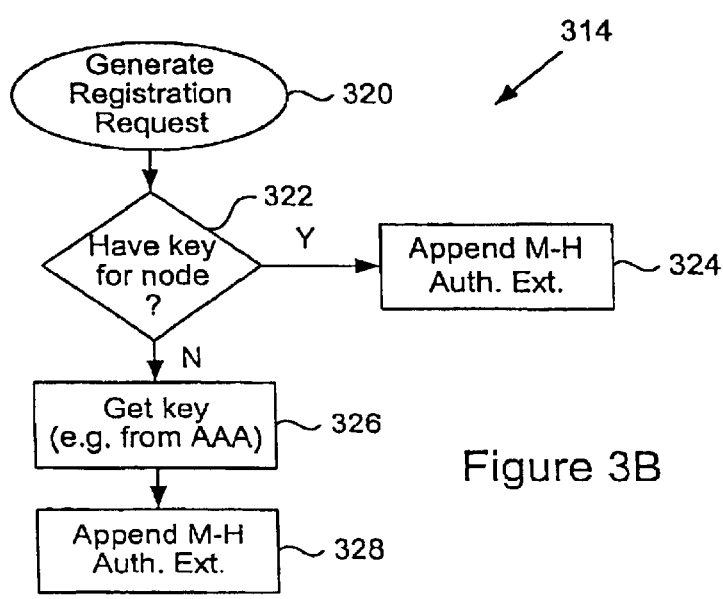
FIG. 3B is a flow diagram illustrating one method of generating a registration request by the Foreign Agent as shown at block 314 of FIG. 3A once it is determined that the node needs to be registered.

As shown at block 314 of FIG. 3A, once it is determined that the node needs to be registered, a registration request is generated. One method of generating a registration request is presented in FIG. 3B. More particularly, in order to generate the registration request 320, it is determined at block 322 whether the Foreign Agent has access to an authentication key for the node. If the Foreign Agent has the key for the node, the Mobile-Home Authentication Extension is created and appended to the registration request at block 324. Alternatively, if the Foreign Agent does not have a key for the node, the key is obtained at block 326. By way of example, the key may be obtained from a AAA server, as described above. More particularly, a key may be stored for each node in a Security Association table. An exemplary Security Association table will be described below with reference to FIG. 3E. The Mobile-Home Authentication Extension is then created and appended at block 328. More particularly, the mandatory fields such as the Home Agent address and the care-of address of the node are specified in the registration request packet. In addition, fields such as the lifetime field may be set to specify desired default settings. An exemplary registration request will be described in further detail with reference to FIG. 5.

Typically, during registration of a mobile node with its Home Agent, the identities of the sending party of the registration request (e.g., mobile node) and the sending party of the registration reply (e.g., Home Agent) are authenticated. During the registration process, a Mobile-Home Authentication Extension is typically appended to both the registration request and the registration reply. Upon receipt of the registration request by the Home Agent and the registration reply by the mobile node, the identity of the sending party is authenticated through the application of the Mobile-Home Authentication Extension.

Figure 3C:
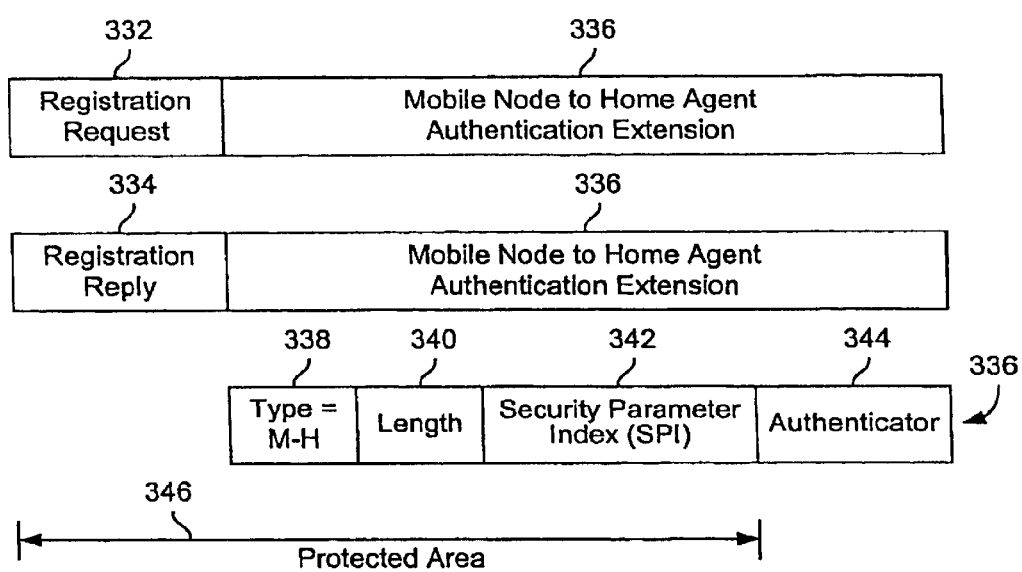
FIG. 3C is a block diagram illustrating a packet format for both the registration request and the registration reply packets that are sent pursuant to RFC 2002.

RFC 2002 specifies the packet format for both the registration request and the registration reply packets that are typically sent between the mobile node and the Home Agent. As shown in FIG. 3C, a registration request packet 332 and registration reply packet 334 both include a mandatory Mobile-Home Authentication Extension 336. More specifically, the mandatory Mobile-Home Authentication Extension 336 includes a type field 338, a length field 340, a security parameter index (SPI) field 342, and an authenticator 344. The type field 338 indicates the type of the extension (i.e., Mobile-Home Authentication Extension) and the length field 340 indicates the length of the extension (e.g., bytes). The Security Parameter Index 342 is an identifier which specifies a security association, or "row" in a security-association table, that a receiver should use to interpret a received packet. The security-association, described in further detail below, defines the key and the algorithm to be applied during the authentication process. Both the registration request packet 332 and the registration reply packet 334 include a protected area 346 which includes the registration request 332/registration reply 334, the type field 338, the length field 340, and the security parameter index (SPI) field 342. Both the mobile node and the Home Agent have access to the same secret key, provided by the security-association, which is used to hash this protected area 346 to create the authenticator 344.

Figure 3D:
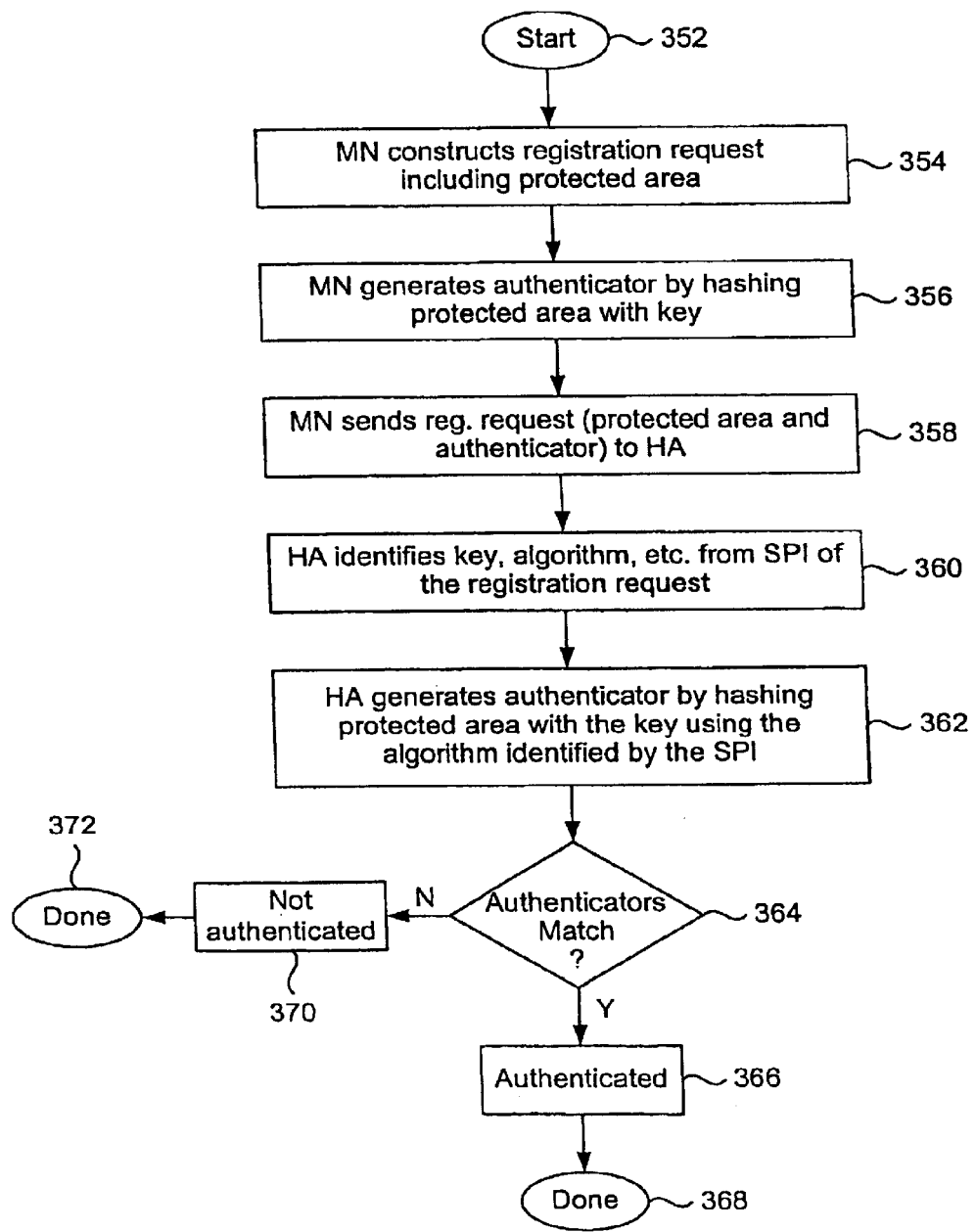
FIG. 3D is a process flow diagram illustrating the process steps performed during authentication of a mobile node that is configured to support the Mobile IP protocol.

FIG. 3D is a process flow diagram illustrating the process steps performed during authentication of a mobile node that is configured to support the Mobile IP protocol. As shown, the process begins at step 352 and at step 354, the mobile node constructs a registration request including a protected area. At step 356, the mobile node generates an authenticator by hashing the protected area with the key through application of a specified algorithm. The mobile node then sends the registration request which includes the protected area and the authenticator to the Home Agent at step 358. The Home Agent then identifies all necessary information such as the key and the algorithm used to generate its authenticator from a security-association, corresponding to the SPI of the registration request, at step 360. Next, at step 362 the Home Agent generates its authenticator by hashing the protected area of the registration request with the key using the algorithm identified by the SPI. The Home Agent then compares the authenticator generated by the mobile node with the authenticator generated by the Home Agent. If it is determined at step 364 that the authenticators match, the mobile node is authenticated at step 366 and the process is completed at step 368. However, if the authenticators do not match, the mobile node is not authenticated at step 370 and the process is completed at step 372. Authentication may similarly be performed by the mobile node upon receipt of the registration reply that is sent by the Home Agent. However, a different SPI and therefore security-association may be applied during authentication of the Home Agent.

As described above, a key used for authentication of a mobile node supporting Mobile IP is typically shared between the node and Home Agent. More particularly, the Mobile-Home Authentication Extension of the registration request is created using this key. Thus, in order to provide access to this key, the key is stored with its corresponding security association in a security association table. As described with respect to the authentication process, a Security Association provides information that is used to generate the authenticators during the authentication process. FIG. 3E is a block diagram illustrating an exemplary security association table that is typically configured on each Home Agent. As shown, a security association table 402 may include one or more entries 404 for each node supported by that Home Agent. For instance, multiple: security associations may be applicable to different types of data transfers that have different security requirements. Therefore, the security association table 402 may include multiple entries 404 for a single node.

Each entry 404 includes a node identifier 406 for the node such as the IP address of the node and an SPI 408 identifying the security association within the security-association table. In addition, an authentication key 410 (e.g., a secret key) is provided. For instance, the authentication key 410 may be encrypted using an MD5 hashing function. As described above, during authentication of a mobile node that implements the Mobile IP protocol, the secret key is shared between the node and the Home Agent. However, according to the present invention, since the node does not implement the IP protocol, the key is shared between the Foreign Agent and the Home Agent. Of course, the security association table may also include security associations for mobile nodes implementing the Mobile IP protocol.

As shown, an algorithm field 412 specifying an algorithm used to create the authenticator is provided (e.g., RSA Message Digest Algorithm MD5). Moreover, a mode field 414 indicates the mode used during authentication (e.g., prefix, suffix, or prefix-suffix). This indicates the portions of the protected region that are hashed with the key. In addition, each entry 404 further includes a replay timer field 416 specifying a replay timer, or timestamp, that indicates a maximum time during which the registration request may be replayed. The replay timer protects against unauthorized copying and "replaying" of registration requests for the purpose of defeating authentication.

Security-association tables may potentially include many thousands of entries and therefore consume a substantial amount of memory. As described above, at least one entry is typically provided in such security-association tables for each mobile node supported by the corresponding Home Agent. Moreover, these security-association tables are typically stored in non-volatile memory to prevent destruction of this information. This does not pose a problem when the Home Agent is a workstation having very large hard disks or other forms of non-volatile memory. However, when a network device such as a router or switch serves as the Home Agent, memory, particularly non-volatile memory, is a premium resource. Although the use of non-volatile memory ensures that security-associations will not be irretrievably lost, non-volatile RAM in a typical router is limited. This physical limitation in memory makes it impossible to store the security-associations for all nodes that could otherwise be supported by a Home Agent. Moreover, according to the present invention, since the node does not support Mobile IP, the registration request is composed and sent by the Foreign Agent. Similarly, the registration reply is received and processed by the Foreign Agent. Accordingly, since the Foreign Agent rather than the node creates the authentication extension (e.g., Mobile-Home Authentication Extension), both the Home Agent and the Foreign Agent preferably have, access to this shared key. More particularly, the key may be made accessible to the Foreign Agent through the use of a mechanism such as a visitor-enabled password. As described above, this shared access may be facilitated through the use of a server such as a AAA server.

Figure 4:
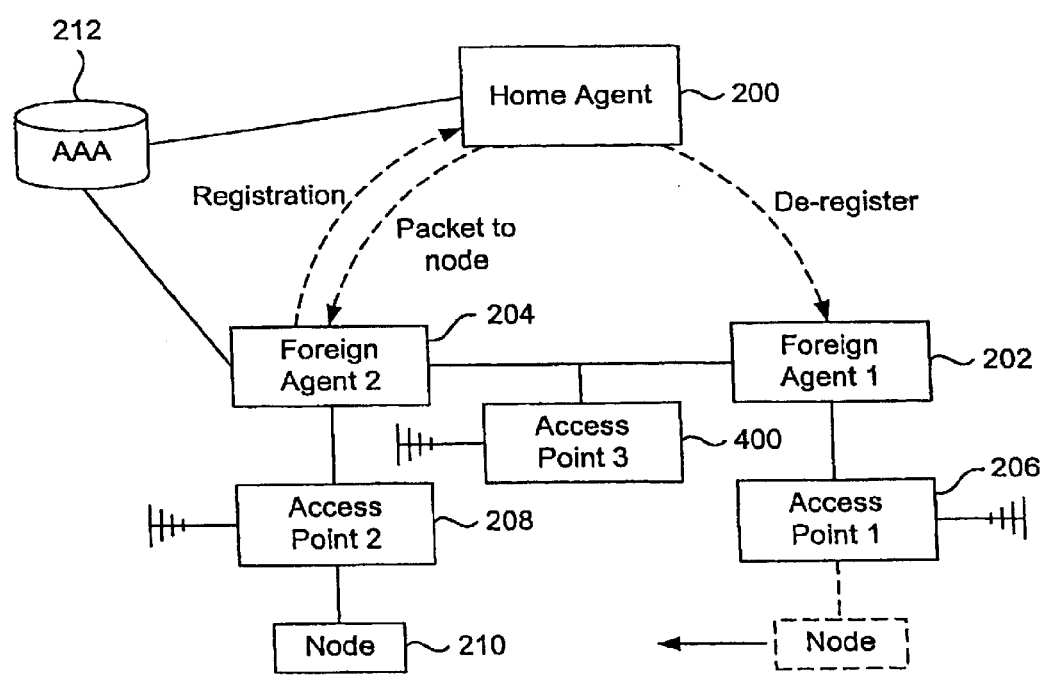
FIG. 4 is a block diagram illustrating a system in which an access point lies between two Foreign Agents.

As described above with reference to block 312 of FIG. 3A, the Foreign Agent determines whether the node needs to be registered with the Home Agent. As shown in FIG. 4, it is possible that an access point 400 lies between two Foreign Agents. Therefore, the node may be detected by two Foreign Agents. In other words, a data packet may be received by two different Foreign Agents via an intervening access point. If one of these Foreign Agents registers the node with its Home Agent, the other Foreign Agent does not also need to register the node with the Home Agent. Thus, it would be beneficial if the second Foreign Agent were able to determine whether the node is currently registered with its Home Agent through another Foreign Agent.

There are various mechanisms through which a Foreign Agent may determine whether a node has completed the registration process via another Foreign Agent and therefore is currently registered with its Home Agent through that Foreign Agent. First, the Time to Live field of the data packet may be specified and the Foreign Agent may be configured to decrement the Time to Live field during the registration process or upon completion of registration. Thus, a second Foreign Agent may ascertain from this field whether the Time to Live field has been previously decremented and therefore that the node has already registered through another Foreign Agent. Second, a Foreign Agent may ascertain from the header of the data packet whether the source MAC address is an address of a router. If the MAC address is an address of a router, the node has previously registered via another Foreign Agent. Third, it may be preferable in a network scheme to exclude access points between Foreign Agents. In this manner, unnecessary determinations by such Foreign Agents of prior registration of a node may be avoided. The above-described options are merely illustrative. Alternate mechanisms for notifying a Foreign Agent of prior registration of a node are possible.

As described above with reference to FIG. 4, an access point may lie between two Foreign Agents. In addition, two access points may provide coverage for the same area and therefore a Foreign Agent may be receiving signals from both access points. For instance, in order to provide continuous wireless coverage, most wireless networks are designed to have overlapping cells (i.e., areas that are covered by multiple access points). Due to the overlapping cells, when a node is in this overlapped area, the node could potentially send packets to or receive packets from any of these access points. It follows that gratuitous ARP replies may be sent by multiple Foreign Agents receiving these packets to update the virtual Foreign Agent MAC address. As a result, there could be continuous cyclic generation of registrations by the Foreign Agents for the node, and continuous updating of bindings at the Foreign Agents (i.e., visitor tables) and the Home Agents (i.e., mobility binding tables). Similarly, the MAC address of the default gateway may toggle between the two Foreign Agents. Thus, the ARP table that is available to the node is constantly being updated with one of the two Foreign Agent MAC addresses.

To prevent the cyclic generation of registrations by multiple Foreign Agents for a single node, there are several possible solutions through which "arbitration" between the two Foreign Agents may be performed. According to a first embodiment, simultaneous bindings may be maintained. In other words, two tunnels are maintained at the Home Agent for the node. By way of example, a mobility binding table maintained at the Home Agent will include a tunnel between the Home Agent and the first Foreign Agent as well as a tunnel between the Home Agent and the second Foreign Agent. The data received at the Home Agent for the node is therefore forwarded through both these tunnels. Similarly, a visitor table maintained at both Foreign Agents will include a tunnel to the Home Agent to enable packets to be reverse tunneled to the node via both Foreign Agents.

Similar to the first embodiment, according to a second embodiment, both tunnels are maintained at the Home Agent as described above. Similarly, a visitor table maintained at both Foreign Agents will include a tunnel to the Home Agent. However, data to the node is sent through only one of the tunnels. The tunnel may be selected by the Home Agent through a variety of algorithms. For instance, the tunnel may be selected according to routing information such as the shortest distance or the latest registration.

According to a third embodiment, since the Home Agent is aware of the toggling registrations sent by the Foreign Agents, the Home Agent may deny registration from one or more Foreign Agents for a specified period of time. This may be accomplished through an indication provided in the registration reply sent from the Home Agent to the denied Foreign Agent(s). Thus, the denied Foreign Agent(s) may learn from the registration reply not to attempt to register for this node for a period of time.

The Foreign Agents typically maintain a history of registrations sent and cancellations received (e.g., in a pending registrations list). Through periodic examination of the pending registrations list, a Foreign Agent may observe that the toggling is occurring. By way of example, a pending registrations list may be examined to determine whether one or more registration requests have been sent on behalf of the node within a specified period of time. Thus, according to a fourth embodiment, a Foreign Agent may avoid registration on behalf of a node for a specified period of time. During this time, the Foreign Agent forwards traffic generated by the node, even though it does not have a tunnel and other state information specified in its visitor table. In other words, the tunnel to the Home Agent is only maintained in one of the Foreign Agents. Although the above-described solutions are described as being applicable where two Foreign Agents are receiving signals from the node, the solutions are equally applicable to a greater number of Foreign Agents.

As described above, the Foreign Agent composes and sends a registration request on behalf of the node wishing to send and receive packets via the Foreign Agent. The RFC provides a format for a registration request packet as well as optional extensions. FIG. 5 is a diagram illustrating a registration request having an extension that may be sent by a Foreign Agent in accordance with an embodiment of the invention. As shown, a registration request packet 502 includes an IP Header 504 as defined in RFC 791. As is well-known in the field, the IP Header 504 includes a version field 506 which specifies which versions of the Internet Protocol are represented in the registration request packet 502. An Internet Header Length (IHL) field 508 provides the length of the IP header 504. In addition, a Type of Service field 510 is used to specify how the registration request packet 502 is to be handled in networks which offer various service qualities. A Total Length field 512 gives the length of the registration request packet in bytes. In addition, an Identification field 514 is a unique value chosen by the sender to allow a recipient to reassemble a packet that had been separated into fragments. A Flags field 516 and a Fragment Offset field 518 are both to separate an IP registration request packet into fragments to traverse networks that are unable to handle large IP packets. A Time to Live field 520 is used to limit the number of times an individual IP packet may be forwarded. Thus, the Time to Live field 520 may be used to indicate whether the node has previously registered through another foreign agent, as described above. A Protocol field 522 is used by the IP layer to determine which higher layer protocol created the "payload," or data passed down from the higher layer protocol, within the IP packet. A Header Checksum field 524 is used by a receiving node to verify that there was no error in transmission of the IP-header portion of the packet. In addition, the IP Header 504 includes a source address 526 and a destination address 528 of the registration request packet 502.

A UDP Header field 530 is provided by RFC 768. In addition, the UDP Header field 530 includes a Source Port field 532, which may be selected by the Foreign Agent sending the registration request packet 502. In addition, the Foreign Agent may set Destination Port field 534 to 434, the value reserved for Mobile IP registration messages. UDP Length field 536 provides the size of the UDP Payload (i.e., the Mobile IP fields) measured in bytes. In addition, a Checksum field 538 permits a receiving node to determine if an error occurred in transmission.

The registration request packet 502 further includes a Fixed-Length Portion 540 of the Registration Request which includes the Mobile IP Fields as provided in RFC 2002. As shown, the Fixed-Length Portion 540 includes multiple fields. A Type field 542 identifies the message as either a Registration Request or a Registration Reply. In addition, the foreign agent may sets an S bit 544 to 1 to ask that the node's Home Agent create or delete a binding for the specified care-of address without affecting any other existing bindings.

B, D, M, G, and V bits provide information required for routing of the registration request packet 502. B bit 546 may be set to 1 by the foreign agent to request that the node's home agent provide it a copy of broadcast packets that occur on the home link. D bit 548 informs the home agent-which entity is performing decapsulation. The D bit 548 is set to 1 for a collocated care-of address and is set to 0 for a foreign agent care-of address. M bit 550 and G bit 552 request that the home agent use minimal encapsulation [RFC 2004] or generic routing encapsulation [RFC 1701] respectively, instead of IP in IP encapsulation [RFC 2003] for tunneling. V bit 554 is set to 1 if the node and foreign agent can support Van Jacobson Header Compression [RFC 1144] across the foreign link. In addition, an rsv field 556 may be reserved for future use.

The remaining fields provide information that may be used during registration of the node. The foreign agent may set the lifetime field 558 to the number of seconds it would like the registration to last before it expires. In addition, the node's Home Address 560 and Home Agent Address 562 are specified. Care-of Address field 564 is set to the specific care-of address being registered or de-registered by the foreign agent on behalf of the node. In addition, an Identification field 566 is chosen to be unique for each attempted registration. The Identification field 566 is typically used to permit a mobile node to match Registration Requests with the corresponding Replies. However, in this instance, the Identification field 566 permits the foreign agent to match Registration Requests with the corresponding Replies on behalf of the node. This prevents an outsider from saving a copy of the Registration Request and resending it at a later time.

Each Registration Request message is required to contain a Mobile-Home Authentication Extension [RFC 2002] 568. The Mobile-Home Authentication Extension is typically used to prove that the message was sent by the node that claims to have sent it. However, in this instance, this extension may be used to prove that the message was sent on behalf of the node and the node may be authenticated according to conventional processes.

Figure 6:
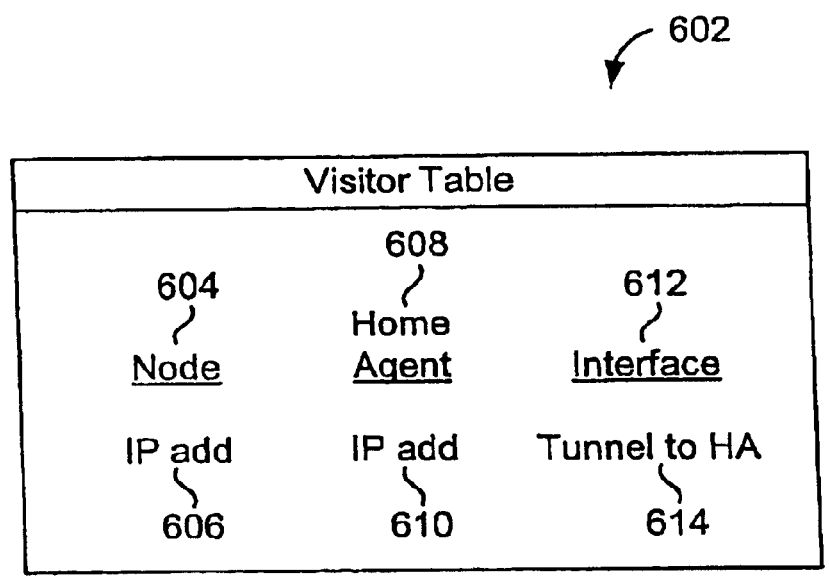
FIG. 6 is a diagram illustrating a conventional visitor table that may be used by an active Foreign Agent.

Once a node has successfully registered with its Home Agent, the mobility binding table of the Home Agent and the visitor table of the Foreign Agent are updated. FIG. 6 is a diagram illustrating a conventional visitor table that may be used by an active Foreign Agent. As shown, visitor table 602 associates node 604 having an IP address 606 with Home Agent 608 having an IP address 610 and a corresponding interface 612. More particularly, the node 604 is associated with the interface 612 and its Home Agent through specifying a tunnel 614 to the Home Agent. Therefore, information for each node visiting the associated Foreign Agent is typically stored in the visitor table. An exemplary, mobility binding table will be shown and described below with reference to FIG. 10.

Figure 7A:
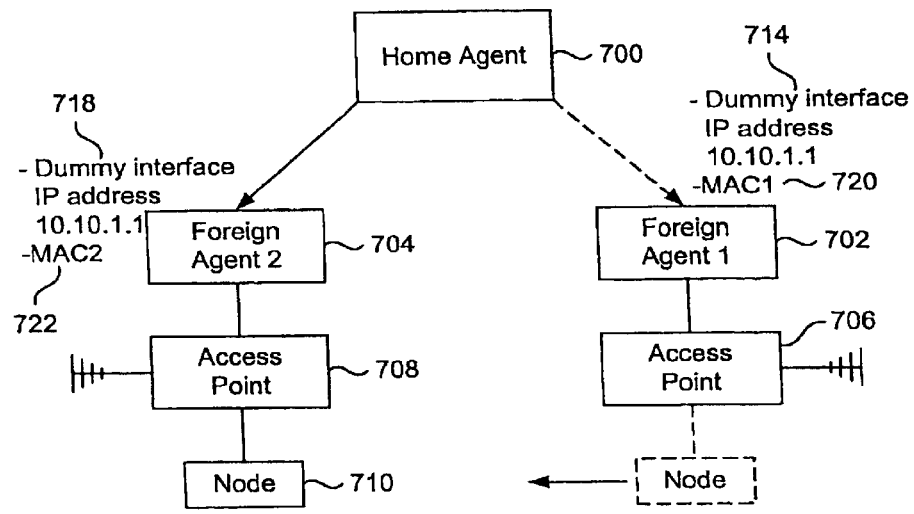
FIG. 7A is a block diagram illustrating a mechanism for implementing a virtual agent according to an embodiment of the invention.

Typically, a node is configured with a default gateway (e.g., Foreign Agent). However, when the node does not implement the Mobile 1P protocol, it cannot modify the gateway through which it sends and receives packets. It is therefore desirable to implement a virtual Foreign Agent such that the node appears to send a packet to only one Foreign Agent rather than to different Foreign Agents each time the node roams to a new Foreign Agent. Thus, a virtual agent scheme is used. According to one embodiment, multiple Foreign Agents have different MAC addresses and a gratuitous ARP is performed to map the appropriate MAC address to the virtual default gateway. According to another embodiment, the Foreign Agents have the same MAC address and therefore a gratuitous ARP is not required. FIG. 7A is a block diagram illustrating a mechanism for implementing a virtual agent according to one embodiment of the invention. As shown, the system includes a Home Agent 700, Foreign Agents 702 and 704, and corresponding Access Points 706 and 708. As described above, it is preferable that it appear to the node that the packets are being sent to a single entity. Thus, when node 710 roams from the first Foreign Agent 702 to the second Foreign Agent 704, it is desirable to provide a single IP address that is associated with both Foreign Agents. As a result, the first Foreign Agent 702 has a dummy interface IP address 714. By way of example, the IP address is shown to be 10.10.1.1. Similarly, the second Foreign Agent 704 is shown to have a dummy interface IP address 718 which is shown to be identical to that of the first Foreign Agent 702. More particularly, the dummy interface IP address may be an IP address that is not used within the network and therefore is dedicated for the purpose of implementing the virtual agent. However, as shown, the MAC address 720 of the first Foreign Agent 702 is different from the MAC address 722 of the second Foreign Agent 704.

Figure 7B:
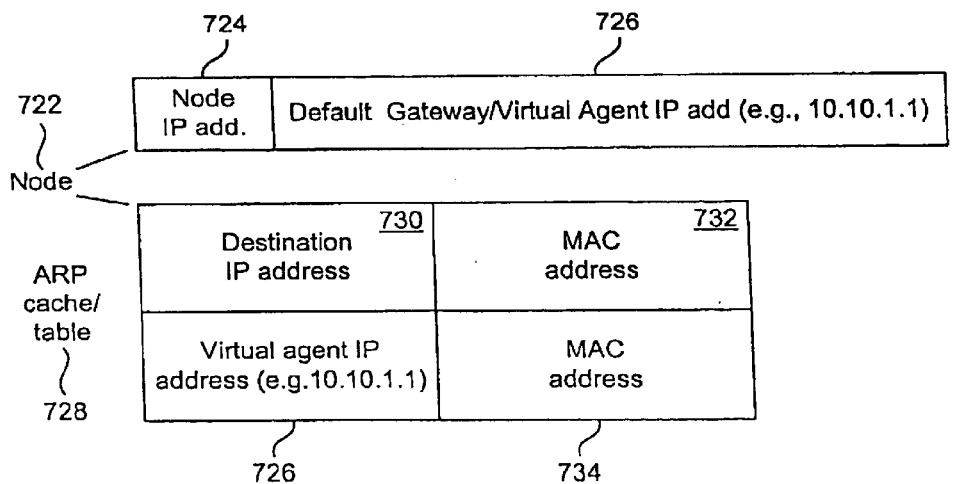
FIG. 7B is a block diagram illustrating a mechanism for updating the MAC address associated with the virtual Foreign Agent according to an embodiment of the invention is presented.

In order to send packets to a corresponding node, the packets must be sent via a Foreign Agent. In order to route packets to one of the Foreign Agents, the mobile node must have the specific MAC address of the Foreign Agent. As shown, in FIG. 7B, a mechanism for updating the MAC address associated with the virtual Foreign Agent according to an embodiment of the invention is presented. Each node 722 has an associated IP address 724. In addition, the node 722 is configured to have a default gateway or "virtual agent IP address" 726 that is associated with the node 722. As described above with reference to FIG. 7A, the virtual agent IP address is 10.10.1.1. In addition, the node 722 has an associated ARP table 728 that maps each destination IP address 730 to a MAC address 732. More particularly, when a packet is sent to a Foreign Agent, the MAC address of the Foreign Agent must be specified. Therefore, according to the present invention, the virtual agent IP address 726 is associated with the corresponding MAC address 734 in the ARP table 728. For instance, the virtual agent IP address 10.10.1.1 may be associated with the MAC address of either the first Foreign Agent 702 or the second Foreign Agent 704.

Since the virtual agent is identified with the appropriate MAC address, as the node roams to a new location, the associated MAC address 734 is updated accordingly. The Foreign Agent may update the MAC address 734 in the ARP table 728 by a performing a gratuitous (i.e., unsolicited) ARP. In this manner, the nodes on the link may be notified that the current mapping in their ARP cache needs to be modified to reflect the virtual Foreign Agent's new link-layer address. The gratuitous ARP may be timer based or event based. By way of example, the Foreign Agent may update the MAC address periodically (e.g., every second or millisecond). As another example, upon detection of the node, the access point could notify the Foreign Agent so that it may update the MAC address in the ARP table. Although this second event based method is more efficient since unnecessary communication is eliminated, this embodiment requires that there be communication between the Foreign Agent and the access point.

Figure 8:
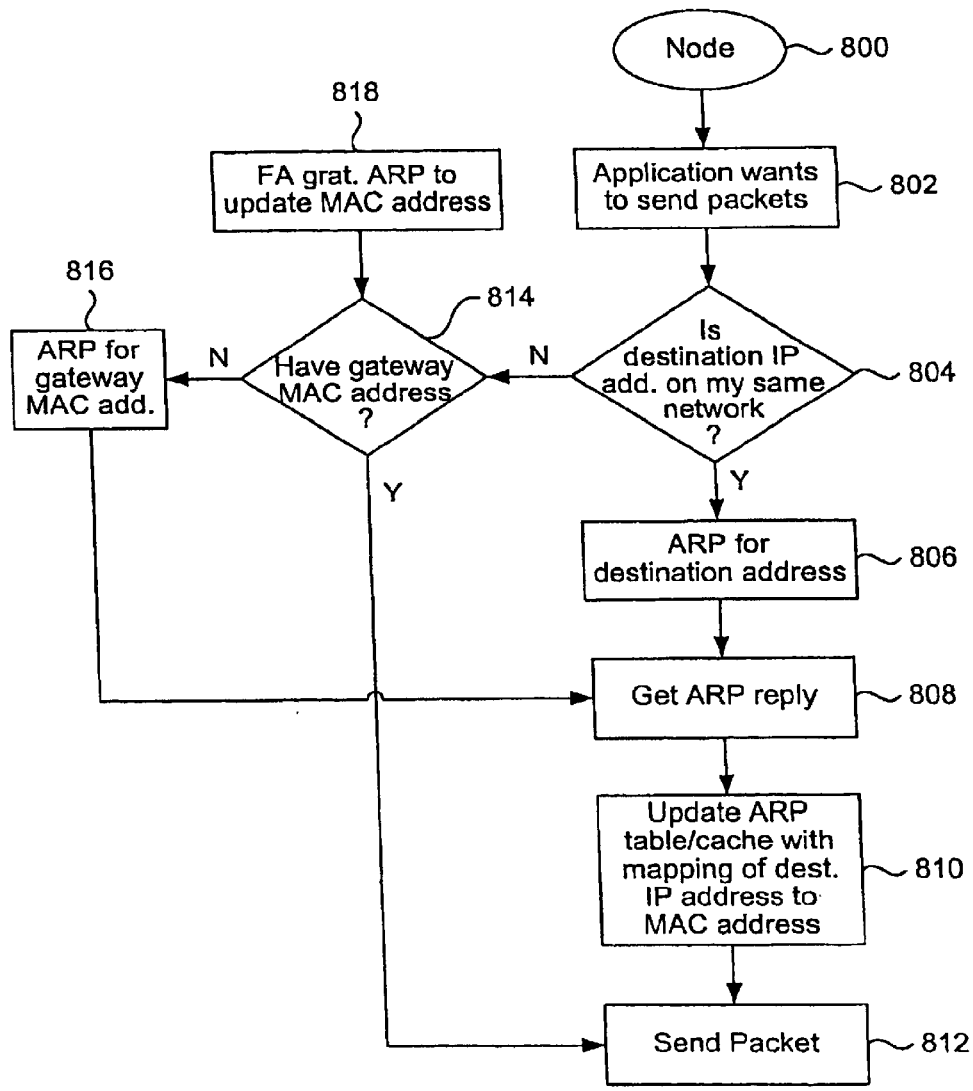
FIG. 8 is a flow diagram illustrating one method of performing registration by a node that does not implement the Mobile IP protocol.

Since the node does not implement the Mobile IP protocol, the node functions without knowledge of the operation of the Foreign Agent or virtual agent scheme. Thus, one method of performing registration by a node 800 that does not implement the Mobile IP protocol is illustrated in FIG. 8. As shown, when the node wishes to send packets 802, it is determined whether the destination IP address is on the network of the node at block 804. According to one embodiment, if the destination IP address is on the same network as the node, the node does not need to obtain the MAC address for the gateway. Alternatively, according to another embodiment, the node may proceed to ARP for the default gateway MAC address as necessary as shown at blocks 814 and 816 even when the destination IP address is on the same network as the node. This may be desirable since when the node communicates directly with a corresponding node, the ARP table of the node will include an entry for the corresponding node including a destination IP address and an associated MAC address. Thus, when the node moves to another Foreign Agent and attempts to communicate directly via this MAC address (rather than the default gateway MAC address), it will lose communication with the corresponding node. In other words, other networks may include nodes with the same MAC address as the corresponding node. Accordingly, it is preferable to force a node to communicate via the default gateway even when a corresponding node is on the same network as the node. Thus, according to this implementation, each node will perceive that it is the only node on its home network.

The node sends an ARP request for the destination MAC address at block 806. Once the node receives the ARP reply at block 808, it updates the ARP table with a mapping of the destination IP address to the associated MAC address at block 810. One or more packets may then be sent at block 812.

If it is determined at block 804 that the destination IP address is not on the same network as the node, it must send packets via a gateway. Thus, at block 814, it is determined whether the node has a gateway MAC address. If the node does have the gateway MAC address, the packet(s) may be sent at block 812. However, if the node does not have the gateway MAC address, the node sends an ARP request for the gateway MAC address at block 816. The process then continues at block 808 to obtain the ARP reply and update the ARP table at block 810. The packets may then be sent via the gateway at block 812.

Typically, the ARP table is updated solely by the node. However, although it appears that the node is updating the ARP table with the appropriate MAC addresses, a problem is created when the node is moving from one Foreign Agent to another Foreign Agent. When this occurs, all packets are lost as the previous Foreign Agent cannot receive them. In other words, during the time that the node is roaming, it may appear at block 814 that the node has the correct gateway (i.e., virtual agent) MAC address and therefore the node may send packets to the incorrect Foreign Agent. In order to solve this problem, according to the present invention, the Foreign Agent performs a gratuitous ARP at block 818 to update the MAC address of the default gateway (i.e., virtual agent), as described above. Accordingly, the ARP table is updated directly by the node and indirectly (e.g., via gratuitous ARP) by the default gateway through which the node wishes to send and receive packets.

Figure 9:
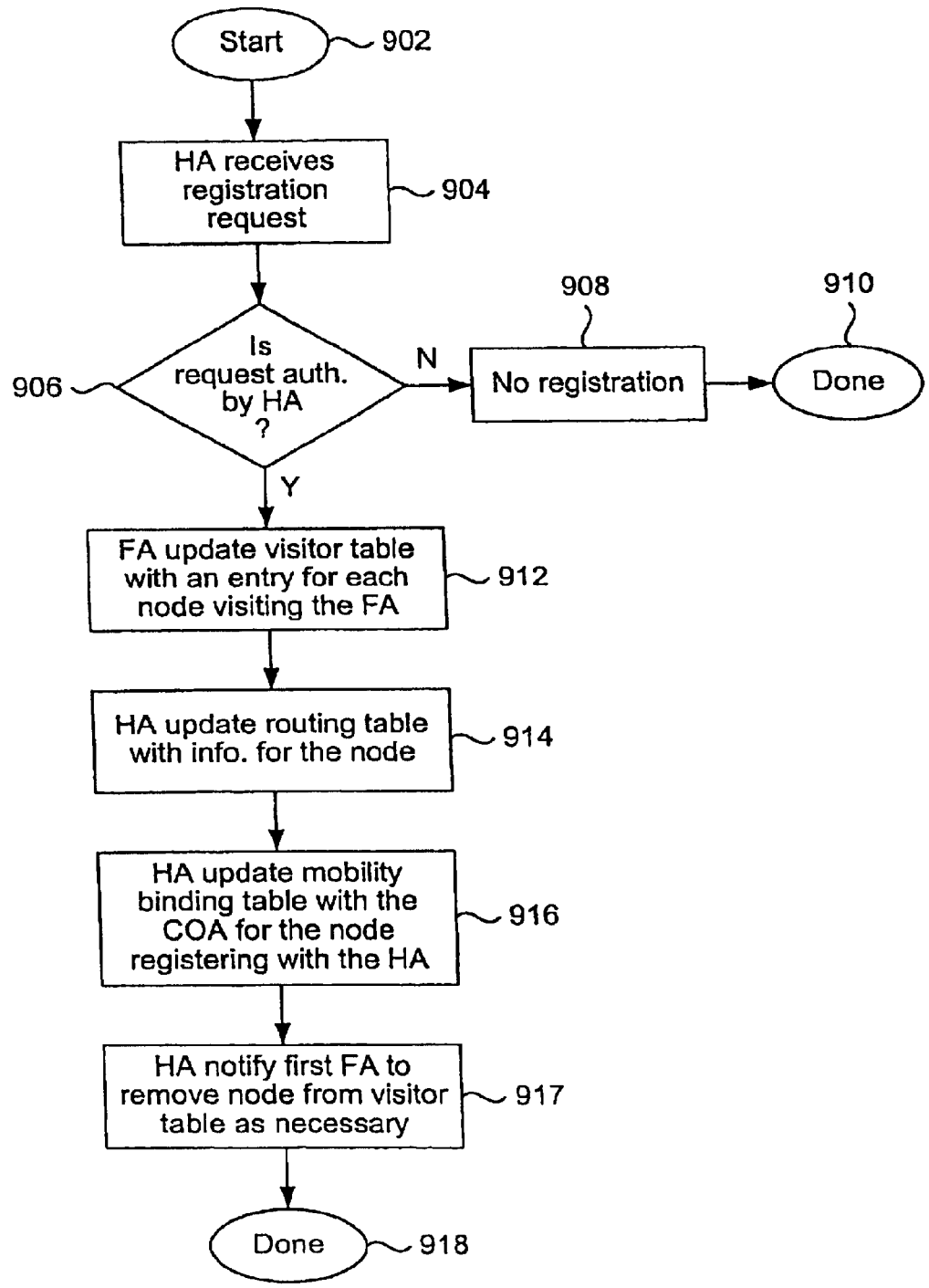
FIG. 9 is a process flow diagram illustrating the steps performed by the Home Agent and the Foreign Agent to complete registration of the node once the registration request packet is received by the Home Agent in accordance an embodiment of the invention.

Once the registration request packet composed by the Foreign Agent is received by the Home Agent, registration is completed. FIG. 9 is a process flow diagram illustrating the steps performed by the Home Agent and the Foreign Agent to complete registration of the node once the registration request packet is received by the Home Agent in accordance with an embodiment of the invention. As shown, the registration process begins at step 902 and at step 904, the Home Agent receives the registration request composed by the Foreign Agent. The registration request comprises a registration request packet that includes the care-of address associated with the foreign agent sending the registration request packet (e.g., the foreign agent care-of address). Next, at step 906, it is determined whether the registration is authenticated by the Home Agent. By way of example, authentication may be performed using the authentication key shared by the Home Agent and the Foreign Agent. At step 908, if the registration is not authenticated, the node is not registered with the Home Agent and the process is complete as indicated at step 910.

If the registration is authenticated, registration is completed in steps 912 through 916. At step 912, a visitor table such as that illustrated in FIG. 6 associated with the Foreign Agent may be updated with entries for nodes that are visiting the Foreign Agent. In this manner, the Foreign Agent may identify and reach those nodes visiting it. At step 914, the Home Agent updates a routing table such as that illustrated in FIG. 11 with information to enable the Home Agent to route packets to each node visiting the Foreign Agent. Next, at step 916, the Home Agent updates a mobility binding table such as that illustrated in FIG. 10 to associate the care-of address with the node. Moreover, where the node has previously registered with another Foreign Agent, the Home Agent may notify the first Foreign Agent to remove information associated with the node from its visitor's table at block 917. In this manner, the Home Agent may initiate de-registration of the node. The process ends at block 918.

Figure 10:
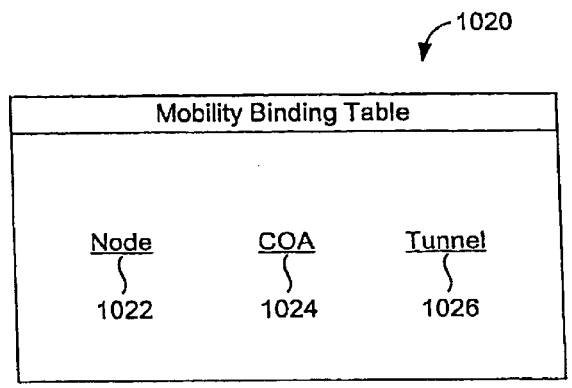
FIG. 10 is a diagram illustrating an exemplary routing table that may be used by an active Home Agent when the node is stationed at the Home Agent in accordance with an embodiment of the invention.
Figure 11:
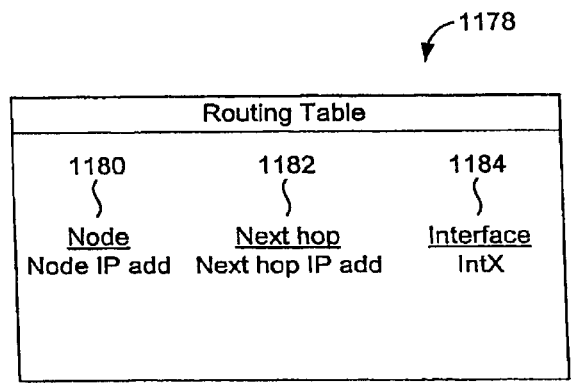
FIG. 11 is a diagram illustrating an exemplary mobility binding table that may be used by an active Home Agent in accordance with an embodiment of the invention.

Exemplary mobility binding and routing tables that may be used by an active Home Agent in accordance with an embodiment of the invention are illustrated in FIGS. 10 and 11. As shown in FIG. 10, mobility binding table 1020 associates node 1022 with care-of address 1024. By way of example, the care-of address 1024 may be a foreign agent address. In addition, the mobility binding table 1020 may include a tunnel interface 1026. The mobility binding table 1020 may include further information related to the registration, such as the lifetime of the registration. The mobility binding table 1020 may include care-of address associations for additional nodes that do not implement the Mobile IP protocol (and other mobile nodes implementing the Mobile IP protocol) based with the same Home Agent. Such additional nodes may be linked to the Foreign Agent or any other Foreign Agent that has registered a Mobile IP connection.

In addition, a routing table is used to route packets to each node supported by the Home Agent. Routing tables typically include a target field, a next hop field, and an interface field. When a node has an IP packet to forward, it searches its routing table for an entry whose target field matches the IP destination address in the packet header of the packet being forwarded. If it finds a matching entry, the node forwards the packet to the node identified by the next hop field in that entry via the link specified in the interface field of that entry. FIG. 11 is a diagram illustrating an exemplary routing table that may be used by an active Home Agent in accordance with an embodiment of the invention. Routing table 1178 associated with the Home Agent includes an entry for one or more nodes that are supported by the Home Agent. As shown, each entry may include a node IP address 1180, a next hop router IP address to the care-of address for the node 1182, and an interface 1184.

Figure 12:
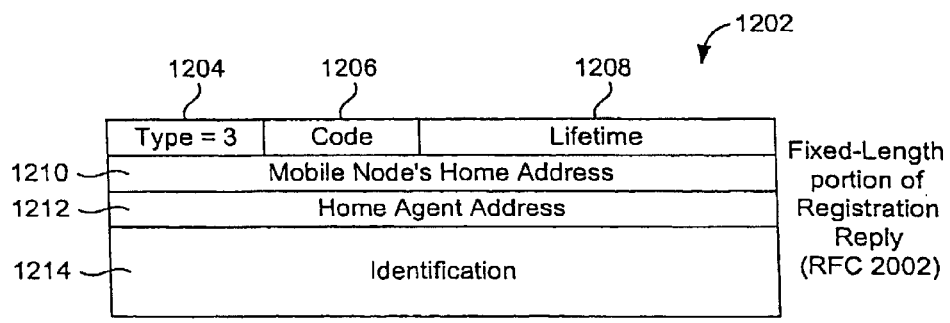
FIG. 12 is a diagram illustrating a registration reply having a Home Address ID extension that may be sent by a Home Agent in accordance with an embodiment of the invention.

Once registration is completed or denied, the status of the registration may be provided by the Home Agent in a registration reply, which is then sent to the Foreign Agent initiating the registration. According to previous techniques as applied to mobile nodes, the registration reply would be forwarded to the node visiting the Foreign Agent. However, since the node does not support Mobile IP, it is incapable of receiving the registration reply. Thus, according to the present invention, the Foreign Agent may examine the registration reply to determine success or failure of the registration. FIG. 12 is a diagram illustrating a registration reply having a Home Address ID extension that may be sent by a Home Agent in accordance with an embodiment of the invention. As shown, the fixed length portion 1202 of the registration reply includes a Type field 1204 that identifies the message as either a Registration Request (1) or a Registration Reply (3). In addition, a Code field 1206 indicates whether the attempted registration was accepted or rejected. A Lifetime field 1208 in the registration reply tells how long the registration lasts before it expires. In addition, the registration reply includes the node's Home Address 1210 and the Home Agent Address 1212. The Identification field 1214 is chosen by the initiator of the registration to be unique for each registration. This typically allows a mobile node to match Registration Requests with the corresponding Registration Replies. However, as described above, since the Foreign Agent is the initiator of the registration, this information will be used by the Foreign Agent to monitor the registrations sent on behalf of the node. In addition, this may be used to prevent a third party from capturing the registration request and replaying it at a later time.

In addition to the above-described embodiments, a node that does not support Mobile IP may be modified minimally to support mobility. For instance, the node's link layer can detect that the signal strength from a new access point is stronger than from a current access point. The node may therefore decide to roam to the new access point. This decision may be communicated to another process which is configured, for example, to send a message or use a mechanism such as ARP to inform a second Foreign Agent of the movement from a first Foreign Agent to the second Foreign Agent. This process may also change the node's parameters such as changing the default gateway and/or clearing the ARP cache, as described above.

The present invention provides methods and apparatus permitting a node that does not support Mobile IP to register with a Home Agent. More particularly, the above-described embodiments enable a Foreign Agent or other router to initiate registration on behalf of a node. Accordingly, through such "proxy" registration, nodes that do not have Mobile IP software, hardware and/or firmware may be provided Mobile IP functionality.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (Home Agent, Foreign Agent, and/or node) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. A general structure for some of these machines will appear from the description given below.

Generally, the registration technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid registration system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the registration systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 13:
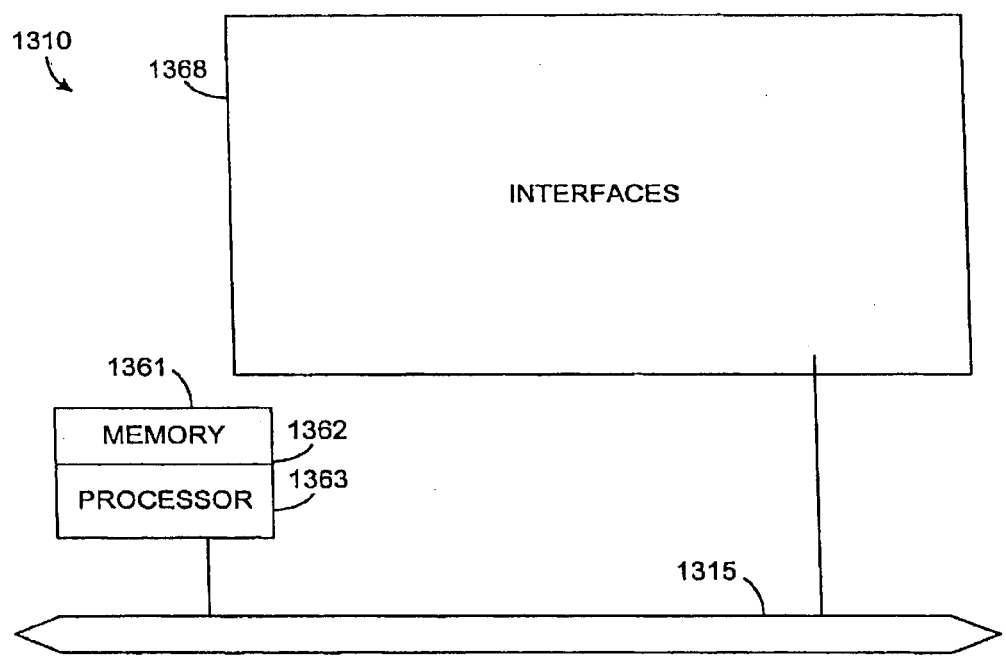
FIG. 13 is a block diagram of a network device that may be configured to implement aspects of the present invention.

Referring now to FIG. 13, a router 1310 suitable for implementing the present invention includes a master central processing unit (CPU) 1362, interfaces 1368, and a bus 1315 (e.g., a PCI bus). When acting under the control of appropriate software or firmware, the CPU 1362 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1362 may include one or more processors 1363 such as a processor from the Motorola family of microprocessors or the MIPS family of microprocessors. In an alternative embodiment, processor 1363 is specially designed hardware for controlling the operations of router 1310. In a specific embodiment, a memory 1361 (such as non-volatile RAM and/or ROM) also forms part of CPU 1362. However, there are many different ways in which memory could be coupled to the system.

The interfaces 1368 are typically provided as interface cards (sometimes referred to as "line cards"). Generally, they control the sending and receiving of data packets over the network and sometimes support other peripherals used with the router 1310. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1362 to efficiently perform routing computations, network diagnostics, security functions, etc.

Although the system shown in FIG. 13 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1361) configured to store program instructions for the general-purpose network operations and mechanisms for registration and routing functions described herein. The program instructions may control the operation of an operating system and/or one or more applications, for example. The memory or memories may also be configured to store tables such as mobility binding and visitor tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to mobile nodes on remote network segments can be used as well. For example, bridges or other less intelligent packet switches may also employ the standby protocol of this invention. Accordingly, the present embodiments are to be considered as illustrative and not restrictive, and the invention is not to be limited to the details given herein, but may be modified within the scope and equivalents of the appended claims.

What is claimed is:

1. In a Foreign Agent that supports Mobile IP, a method of registering a node that does not support Mobile IP with a Home Agent that supports Mobile IP, the method comprising:
    detecting a node in a vicinity of the Foreign Agent;
    composing a registration request specifying a node ID associated with the node; and
    sending the registration request to the Home Agent.

2. The method as recited in claim 1, further including:
    receiving a registration reply from the Home Agent; and
    examining the registration reply to determine success or failure of the registration.

3. The method as recited in claim 1, wherein detecting includes at least one of receiving an ARP request, receiving a data packet, and receiving an access point control packet.

4. The method as recited in claim 1, further including:
    indicating in the registration request that the node has registered with its Home Agent via the Foreign Agent.

5. The method as recited in claim 4, wherein the registration request includes a Time to Live field and wherein indicating in the registration request includes decrementing the Time to Live field upon completion of registration of the node with the Home Agent.

6. The method as recited in claim 1, wherein the Foreign Agent is associated with a virtual agent IP address.

7. The data structure as recited in claim 6, wherein the virtual agent IP address is a single IP address that is associated with an interface of a plurality of Foreign Agents.

8. The method as recited in claim 1,
    wherein upon receiving the registration request from the Foreign Agent, the Home Agent performs de-registration of the node to update a mobility binding table such that movement of the node from the Home Agent to the Foreign Agent is recorded, wherein performing de-registration is performed without a de-registration message from the node indicating that the node requests de-registration.

9. The method as recited in claim 1, further comprising:
    assigning an IP address to an interface of the Foreign Agent, the interface of the Foreign Agent being associated with a MAC address, wherein the IP address is assigned to an interface of one or more additional Foreign Agents having a corresponding MAC address, thereby enabling the node to roam to the additional Foreign Agents by accessing an ARP table in which the IP address is mapped to the MAC address of the interface of each of the one or more additional Foreign Agents.

10. The method as recited in claim 1, further comprising:
    receiving a notification from the Home Agent at the Foreign Agent indicating that the mode has moved to another Foreign Agent; and
    updating a visitor table to reflect roaming of the node from the Foreign Agent to another Foreign Agent.

11. The method as recited in claim 1, further comprising:
    wherein the registration request is denied by the Home Agent for a specified period of time when a second registration request is subsequently received by the Home Agent from another Foreign Agent on behalf of the node.

12. The method as recited in claim 1, further comprising:
    detecting a node in a vicinity of the Foreign Agent, wherein detecting the node includes at least one of receiving an ARP request, receiving a data packet, and receiving an access point control packet; and
    notifying the node that its ARP table needs to be modified to reflect a mapping of the MAC address to a virtual Foreign Agent IP address associated with the Foreign Agent.

13. The method as recited in claim 12, further including:
    determining that the node has not registered with its Home Agent via the Foreign Agent.

14. The method as recited in claim 13, wherein determining that the node has not registered with its Home Agent via the Foreign Agent includes comparing a node ID identifying the node with one or more entries in a visitor table associated with the Foreign Agent.

15. The method as recited in claim 12, wherein notifying includes performing a gratuitous ARP in response to detecting the node such that the MAC address is mapped to the virtual Foreign Agent IP address in the ARP table.

16. The method as recited in claim 1, further comprising:
receiving a data packet identifying the node; and
examining the data packet to ascertain whether the node has previously registered with its Home Agent via another Foreign Agent.

17. The method as recited in claim 16, wherein the data packet includes a Time to Live field and examining the data packet includes determining whether the Time to Live field has previously been decremented to indicate that registration has been completed.

18. The method as recited in claim 16, wherein the data packet includes a header identifying a source MAC address and examining the data packet to ascertain whether the node has previously registered with its Home Agent via another Foreign Agent includes ascertaining whether the source MAC address identifies a router.

19. The method as recited in claim 1, further comprising:
examining a pending registrations list to determine whether a plurality of registration requests have been sent on behalf of the node within a first specified period of time;
wherein when it is determined that a plurality of registration requests have been sent on behalf of the node within the first specified period of time, the Foreign Agent forwards traffic generated by the node and avoids registration on behalf of the node for a second specified period of time.

20. The method as recited in claim 1, further comprising:
receiving a message from the node indicating that the node is in a vicinity of the Foreign Agent such that the Foreign Agent is made aware of movement of the node to the second Foreign Agent.

21. The method as recited in claim 1, further comprising:
receiving a message indicating that the node is in a vicinity of the Foreign Agent; and
modifying a default gateway associated with the node, the default gateway associating a virtual IP address with a MAC address of the Foreign Agent, the virtual IP address being associated with an interface of the Foreign Agent.

22. The method as recited in claim 1 further comprising:
receiving a notification at the Foreign Agent from the Home Agent to update its visitor table to reflect roaming of the node from the Foreign Agent to the Home Agent.

23. A Foreign Agent that supports Mobile IP and adapted for registering a node that does not support Mobile IP with a Home Agent that supports Mobile IP, comprising:
a processor; and
a memory, at least one of the processor and the memory being adapted for:
detecting a node in a vicinity of the Foreign Agent;
composing a registration request specifying a node ID associated with the node; and
sending the registration request to the Home Agent.

24. A Foreign Agent that supports Mobile IP and adapted for registering a node that does not support Mobile IP with a Home Agent that supports Mobile IP, comprising:
means for detecting a node in a vicinity of the Foreign Agent;
means for composing a registration request specifying a node ID associated with the node; and
means for sending the registration request to the Home Agent.

25. A computer-readable medium storing thereon computer-readable instructions for registering a node that does not support Mobile IP with a Home Agent that supports Mobile IP in a Foreign Agent that supports Mobile IP, comprising:
instructions for detecting a node in a vicinity of the Foreign Agent;
instructions for composing a registration request specifying a node ID associated with the node; and
instructions for sending the registration request to the Home Agent.

26. A Home Agent supporting Mobile IP and adapted for registering a node that does not implement Mobile IP, comprising:
a processor; and
a memory, at least one of the processor and the memory being adapted for:
receiving a registration request from a Foreign Agent, the registration request specifying a node ID of the node; and
performing de-registration of the node to update a mobility binding table such that movement of the node from the Home Agent to the Foreign Agent is recorded, wherein performing de-registration is performed without a de-registration message from the node indicating that the node requests de-registration.

27. A Home Agent supporting Mobile IP and adapted for registering a node that does not implement Mobile IP, comprising:
means for receiving a registration request from a Foreign Agent, the registration request specifying a node HD of the node; and
means for performing de-registration of the node to update a mobility binding table such that movement of the node from the Home Agent to the Foreign Agent is recorded, wherein performing de-registration is performed without a de-registration message from the node indicating that the node requests de-registration.

28. A computer-readable medium storing thereon computer-readable instructions for registering a node that does not implement Mobile IP in a Home Agent supporting Mobile IP, comprising:
instructions for receiving a registration request from a Foreign Agent, the registration request specifying a node ID of the node; and
instructions for performing de-registration of the node to update a mobility binding table such that movement of the node from the Home Agent to the Foreign Agent is recorded, wherein performing de-registration is performed without a de-registration message from the node indicating that the node requests de-registration.

29. A method of enabling a node that does not support Mobile IP to send a packet from a Foreign Agent that supports Mobile IP, the method comprising:
roaming to a Foreign Agent;
registering with the Home Agent through a registration request composed by the Foreign Agent on behalf of the node; and
sending a packet via a default gateway associated with the node, the default gateway associating a virtual IP address with a MAC address of the Foreign Agent, the virtual IP address being associated with a plurality of Foreign Agents including the Foreign Agent to which the node has roamed.

30. A computer-readable medium for enabling a node that does not support Mobile IP to send a packet from a Foreign Agent that supports Mobile IP, comprising:

instructions for roaming to a Foreign Agent;

instructions for registering with the Home Agent through a registration request composed by the Foreign Agent on behalf of the node; and instructions for sending a packet via a default gateway associated with the node, the default gateway associating a virtual IP address with a MAC address of the Foreign Agent, the virtual IP address being associated with a plurality of Foreign Agents including the Foreign Agent to which the node has roamed.

31. A Home Agent that supports Mobile IP and adapted for registering a node that does not support Mobile IP, comprising:

means for receiving a first registration request identifying the node from a first Foreign Agent composed by the first Foreign Agent on behalf of the node that does not support Mobile IP;

means for receiving a second registration request identifying the node from a second Foreign Agent composed by the second Foreign Agent on behalf of the node that does not support Mobile IP;

means for updating a mobility binding table to include an entry specifying a first tunnel between the Home Agent and the first Foreign Agent; and means for updating the mobility binding table to include an entry specifying a second tunnel between the Home Agent and the second Foreign Agent, wherein updating the mobility binding table to include an entry specifying the second tunnel is performed without removing the entry specifying the first tunnel.

32. A Foreign Agent having a virtual Foreign Agent IP address and a MAC address, the Foreign Agent implementing Mobile IP and adapted for updating an ARP table, the comprising:

a processor; and a memory, at least one of the processor and the memory being adapted for:

detecting a node in a vicinity of the Foreign Agent, wherein detecting the node includes at least one of receiving an ARP request, receiving a data packet, and receiving an access point control packet; and notifying the node that the ARP table needs to be modified to reflect a mapping of the MAC address to the virtual Foreign Agent IP address.

33. A computer-readable medium storing thereon computer-readable instructions for updating an ARP table in a Foreign Agent having a virtual Foreign Agent IP address and a MAC address, the Foreign Agent implementing Mobile IP, comprising:

instructions for detecting a node in a vicinity of the Foreign Agent, wherein detecting the node includes at least one of receiving an ARP request, receiving a data packet, and receiving an access point control packet; and instructions for notifying the node that the ARP table needs to be modified to reflect a mapping of the MAC address to the virtual Foreign Agent IP address.

34. A Home Agent supporting Mobile IP, a method of registering a node that does not support Mobile IP, comprising:

a processor; and a memory, at least one of the processor and the memory being adapted for:

updating a mobility binding table to remove an association between the first Foreign Agent and the node when the node roams from the first Foreign Agent to its Home Agent; and notifying the first Foreign Agent to update its visitor table to reflect roaming of the node from the first Foreign Agent to the Home Agent.

35. A computer-readable medium storing thereon computer-readable instructions for registering a node that does not support Mobile IP in a Home Agent supporting Mobile IP, comprising:

instructions for updating a mobility binding table to remove an association between the first Foreign Agent and the node when the node roams from the first Foreign Agent to its Home Agent; and instructions for notifying the first Foreign Agent to update its visitor table to reflect roaming of the node from the first Foreign Agent to the Home Agent.

36. A Foreign Agent that supports Mobile IP, the Foreign Agent being adapted for determining whether a node has previously registered with its Home Agent via another Foreign Agent, comprising:

a processor; and a memory, at least one of the processor and the memory being adapted for:

receiving a data packet identifying the node; and examining the data packet to ascertain whether the node has previously registered with its Home Agent via another Foreign Agent.

37. A computer-readable medium storing thereon computer-readable instructions for determining whether a node has previously registered with its Home Agent via another Foreign Agent in a Foreign Agent that supports Mobile IP, comprising:

instructions for receiving a data packet identifying the node; and instructions for examining the data packet to ascertain whether the node has previously registered with its Home Agent via another Foreign Agent.

38. A Foreign Agent that supports Mobile IP and adapted for registering a node that does not support Mobile IP, comprising:

a processor; and a memory, at least one of the processor and the memory being adapted for:

examining a pending registrations list to determine whether a plurality of registration requests have been sent on behalf of the node within a first specified period of time;

wherein when it is determined that a plurality of registration requests have been sent on behalf of the node within the first specified period of time, the Foreign Agent forwards traffic generated by the node and avoids registration on behalf of the node for a second specified period of time.

39. A computer-readable medium storing thereon computer-readable instructions for registering a node that does not support Mobile IP in a Foreign Agent that supports Mobile IP, comprising:

instructions for examining a pending registrations list to determine whether a plurality of registration requests have been sent on behalf of the node within a first specified period of time;

instructions for forwarding traffic generated by the node and avoiding registration on behalf of the node for a second specified period of time when it is determined that a plurality of registration requests have been sent on behalf of the node within the first specified period of time.

40. A Foreign Agent that supports Mobile IP and adapted for registering a node that does not support Mobile IP, comprising:

means for examining a pending registrations list to determine whether a plurality of registration requests have been sent on behalf of the node within a first specified period of time;

means for forwarding traffic generated by the node and avoiding registration on behalf of the node for a second specified period of time when it is determined that a plurality of registration requests have been sent on behalf of the node within the first specified period of time.

41. A node that does not support Mobile IP capable of roaming from a first Foreign Agent to a second Foreign Agent, comprising:

a processor; and a memory, at least one of the processor and the memory being adapted for:

detecting a signal from an access point associated with the second Foreign Agent; and sending a message indicating that the node is in a vicinity of the second Foreign Agent such that the second Foreign Agent is made aware of movement of the node to the second Foreign Agent.

42. A computer-readable medium storing thereon computer-readable instructions for enabling a node that does not support Mobile IP to roam from a first Foreign Agent to a second Foreign Agent, comprising:

instructions for detecting a signal from an access point associated with the second Foreign Agent; and instructions for sending a message indicating that the node is in a vicinity of the second Foreign Agent such that the second Foreign Agent is made aware of movement of the node to the second Foreign Agent.

\* \* \* \* \*